(12) United States Patent
Kalandek

(10) Patent No.: US 9,096,193 B2
(45) Date of Patent: Aug. 4, 2015

(54) AIRBAG WITH ENHANCED GAS DIFFUSER

(71) Applicant: Key Safety Systems, Inc., Sterling Heights, MI (US)

(72) Inventor: Bruce Andrew Kalandek, Dearborn, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 90 days.

(21) Appl. No.: 13/669,320

(22) Filed: Nov. 5, 2012

(65) Prior Publication Data

US 2014/0125041 A1 May 8, 2014

(51) Int. Cl.
| | |
|---|---|
| *B60R 21/26* | (2011.01) |
| *B60R 21/2346* | (2011.01) |
| *B60R 21/232* | (2011.01) |
| *B60R 21/235* | (2006.01) |
| *B60R 21/261* | (2011.01) |

(52) U.S. Cl.
CPC ........... *B60R 21/2346* (2013.01); *B60R 21/232* (2013.01); *B60R 21/235* (2013.01); *B60R 2021/23533* (2013.01); *B60R 2021/2612* (2013.01); *B60R 2021/2617* (2013.01); *Y10T 29/49* (2015.01)

(58) Field of Classification Search
CPC .... B60R 21/232; B60R 21/213; B60R 21/26; B60R 21/261; B60R 21/235; B60R 21/2346; B60R 2021/2617; B60R 2021/2612; B60R 2021/23533

USPC .................... 280/730.2, 742, 740, 743.1, 739
See application file for complete search history.

(56) References Cited

U.S. PATENT DOCUMENTS

| | | | | |
|---|---|---|---|---|
| 6,811,184 | B2 * | 11/2004 | Ikeda et al. | 280/742 |
| 7,789,418 | B2 | 9/2010 | Wipasuramonton | |
| 7,883,112 | B2 * | 2/2011 | Wold et al. | 280/743.1 |
| 7,942,441 | B2 * | 5/2011 | Magnin et al. | 280/740 |
| 8,006,999 | B2 * | 8/2011 | Suemitsu et al. | 280/730.2 |
| 8,235,415 | B2 * | 8/2012 | Gamill et al. | 280/730.2 |
| 2010/0084841 | A1 | 4/2010 | Suemitsu et al. | |

FOREIGN PATENT DOCUMENTS

| | | |
|---|---|---|
| DE | 202007007355 U1 | 9/2007 |
| WO | 2009146220 A1 | 12/2009 |

* cited by examiner

*Primary Examiner* — Paul N Dickson
*Assistant Examiner* — Joselynn Y Sliteris
(74) *Attorney, Agent, or Firm* — Markell Seitzman

(57) ABSTRACT

An improved airbag assembly (20) has an inflator (40), an airbag (20) and a diffuser (70). The diffuser (70) is formed from two folded inner and outer pocket panel layers of fabric and sewn to the airbag (20). The folded inner pocket layer (71) is configured to fit inside the outer pocket layer (73) forming a two-layer structure. The fold (75) in the inner layer (71) is oriented in a first direction relative to the weave of the fabric and the fold of the outer layer (73) is oriented at a second direction relative to the weave of the fabric wherein the second direction is different from the first direction. The first direction and second direction of folds (75, 77) are inclined relative to the other so upon assembly the inner pocket layer (71) fabric weave is directionally inclined on a bias relative to the outer pocket layer (73) fabric weave.

10 Claims, 4 Drawing Sheets

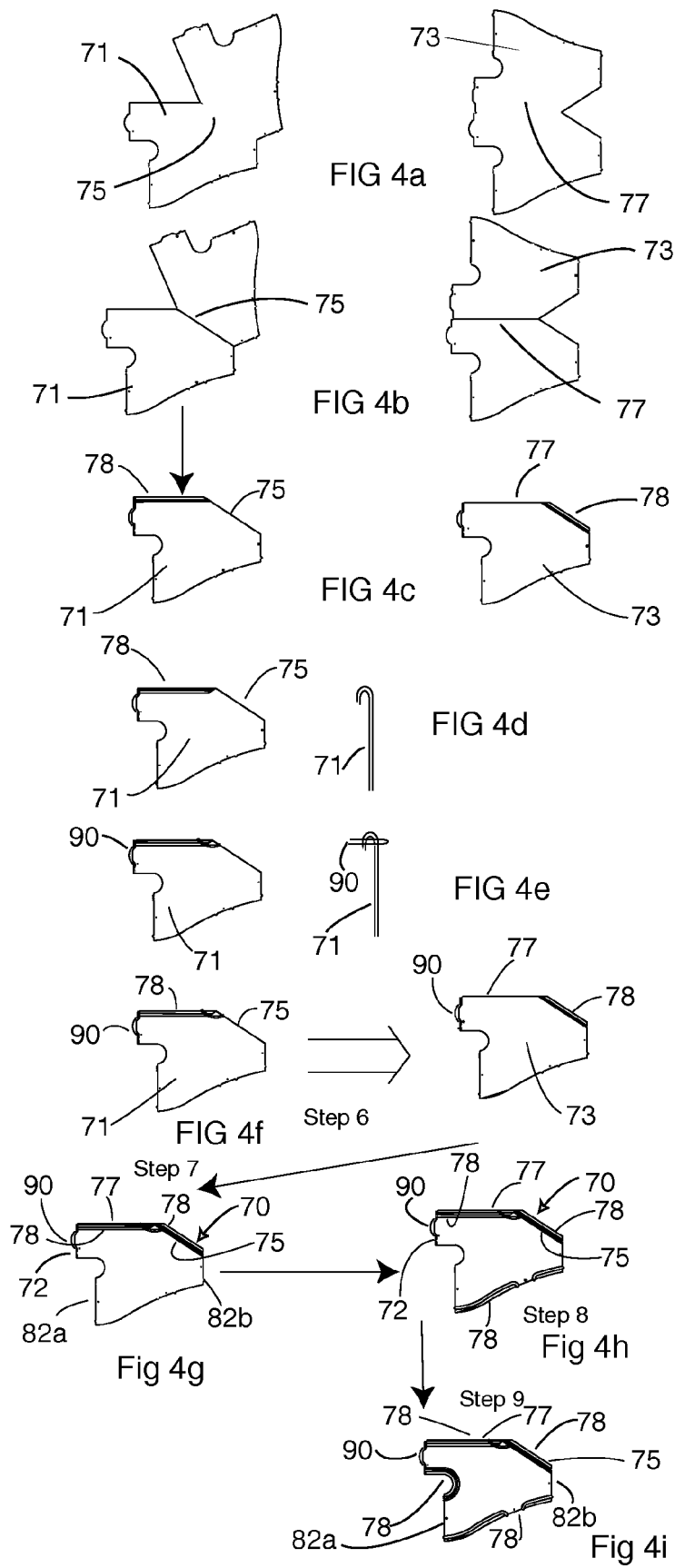

AIRBAG WITH ENHANCED GAS DIFFUSER

FIELD OF THE INVENTION

This invention relates to safety restraint systems for vehicles and more particularly to an improved airbag with an enhanced diffuser.

BACKGROUND OF THE INVENTION

Airbags generally provide vehicle occupant protection. Regardless of the application, airbags generally have the common feature of distributing inflation gases quickly into the inflatable portions of the airbag cushion. This distribution and filling the airbag can be more or less difficult depending on the shape of the airbag being deployed. One example of a more complex inflation challenge is side curtain airbags (also referred to herein as a curtain airbag).

The side curtain airbag assembly provides protection of the vehicle occupants along the sides of the vehicle, more particularly from the roof down across the door windows and pillars. On deployment a gas generating inflator is activated to fill inflatable chambers of the bag. As the length of a vehicle can vary the overall length of the airbag similarly can be great. For the inflator to properly fill the airbag, the inflator is often placed close to the middle of the bag so gas can flow from the center outwardly toward both ends. One way to enhance uniform distribution of the inflation gases is to provide a fabric diffuser which receives the nozzle end of a cylindrical inflator and simultaneously distributes the inflation gases in a generally forward and rearward direction to more quickly and uniformly fill the inflatable chambers along the length of the curtain airbag. Such a curtain airbag is described in U.S. Pat. No. 7,789,418 entitled "Curtain Airbag Assembly," the subject matter of which is hereby incorporated by reference in its entirety.

During the manufacture of the curtain airbag, fabric is sewn and stitched together or woven to form a side curtain airbag with inflatable chambers, non-inflatable regions, gas flow channels and border or perimeter seams. These border or perimeter seams provide anchoring locations to secure the curtain airbag to the vehicle.

In the airbag there is provided an inlet opening for receiving a fill tube connected to an inflator or an inflator is placed at least partially into the inlet and the inlet is clamped about the body of the inflator with the gas discharging nozzle end sealed inside the cushion at the clamped inlet. Preferably, this inlet for the inflator can be made part of an internally located fabric diffuser. The diffuser has the inlet opening and a small discharge chamber with at least one, but preferably two gas discharge openings as shown in prior art FIG. 1 of U.S. Pat. No. 7,789,418; this prior art diffuser had one circular gas discharge opening in the fabric panel for this purpose. In a more preferred embodiment, a prior art diffuser is shown in prior art FIG. 2 having two gas discharge openings. The directionally opposite facing opening allows inflation gas to escape fore and aft to rapidly fill the cushion along its length as it deploys. One concern of this prior art diffuser was its ability to absorb the high pressure of inflation without tearing. In order to keep the diffuser intact, it was proposed to fold the panels of the diffuser over using one or more panels sewn together in various regions forming seams.

While this diffuser was a good improvement over the earlier prior art, it was limited in the amount of pressure it could withstand at the seam joints, most particularly at the upper perimeter seam joints attaching the diffuser to the airbag. While the folded seamless portion afforded good peak pressure survivability, it was believed even this diffuser could be improved in terms of structural integrity when exposed to very high inflation pressures. More importantly, if the diffuser strength could be increased, more aggressive inflation could be used to decrease deployment and fill times.

While this prior art curtain airbag example is one having a difficult inflation requirement, it is important to note it is merely an example and many other types of airbags can benefit by improved bag structures and design that can withstand rapid high peak inflation pressure and improved inflation gas distribution.

These and other improvements are found in the invention described as follows.

SUMMARY OF THE INVENTION

An improved airbag assembly having an inflator, an airbag and a diffuser. The inflator provides a source of inflation gas. The airbag has a first end, a second end and a first side and a second side extending between said ends defining the curtain airbag configured with one or more inflatable chambers. The diffuser has an inlet for receiving the inflator and one or more discharge openings to fill the inflatable chambers. The diffuser is affixed internal of the airbag preferably at or along a seam between the first and second ends. The diffuser is formed from a folded inner and outer pocket panel layer of fabric and sewn or otherwise affixed to the airbag. At least one layer of the diffuser has a seamless fold at the attachments of the airbag where the diffuser is sewn or otherwise affixed to the airbag. Both panel layers of the diffuser have a seamless fold at the attachment to the airbag where sewn or otherwise affixed to the airbag. The folded inner pocket panel layer is configured to fit inside the outer pocket layer forming a two-layer structure. The fold in the inner layer is oriented in a first direction relative to the weave of the fabric and the fold of the outer layer is oriented at a second direction relative to the weave of the fabric wherein the second direction is different from the first direction.

In one embodiment, the fold of the inner pocket and the fold of the outer pocket each align with a stitched seam of the other panel to form one seamless layer and one stitched seam where the diffuser is sewn to the curtain airbag. The fold forming the seamless layer of one panel underlies or overlies the other panel to form a continuous length of seamless fabric along the attachment to the airbag at the top seam. The first direction and second direction of folds are inclined relative to the other so upon assembly the inner panel layer fabric weave is directionally inclined on a bias relative to the outer panel layer fabric weave.

Preferably, the diffuser has the respective inner and outer pocket layers sewn together in one or more locations spaced from the folds and has unsewn panel portions forming the inlet and the one or more discharge openings. Adjacent the folds, the inlet for receiving the inflator has the inner pocket layer sewn to the outer pocket in a path at least partially parallel to the attachment to the airbag to form a pocket into which the inflator is inserted. The path extends to a turn and forms a "U" shape sewn seam below the inlet and above one of the discharge openings.

The method of manufacturing a two-layer fabric diffuser has the steps of cutting an inner pocket fabric layer; folding the inner fabric layer to form an edge with a seamless portion and sewing a portion of the panel together up to the fold which forms the seamless portion; cutting an outer pocket fabric layer; folding the outer fabric layer to form an edge with a seamless portion and sewing a portion of the panel together up to the seamless portion; inserting the folded inner pocket layer into the folded outer pocket layer to form an assembly; sewing a bottom seam on the assembly forming one or more discharge openings between the edge and the bottom seam; and sewing an inlet seam below the edge for receiving an inflator, the inlet seam being spaced from the edge. The step of folding includes folding the inner layer in a first direction relative to the weave of the fabric of the inner layer and folding the outer layer in a second direction relative to the weave of the fabric of the outer layer wherein the second direction of the folds is different from the first direction of the folds. The step of inserting has the first direction and second direction of the folds inclined relative to the other so upon assembly the inner panel fabric weave is directionally inclined on a bias relative to the outer panel layer fabric weave. The step of sewing the inlet seam includes sewing a "U" shaped seam to seal the diffuser between the inlet to a discharge end.

BRIEF DESCRIPTION OF THE DRAWINGS

The invention will be described by way of example and with reference to the accompanying drawings in which:

FIGS. 4a-4h are plan views of a preferred embodiment diffuser inner pocket layer and outer pocket layer during the various steps of assembly.

FIG. 4a shows the cut-out pattern with solid portions showing the folds for the inner and outer pocket layers.

FIG. 4b shows the fold in solid lines of the inner pocket layer and outer pocket.

FIG. 4c shows the inner pocket layer and outer pocket layer folded over each having a sewn seam.

FIG. 4d has the inner pocket layer shown folded over showing the folded shape with the top folded over as depicted from both the side and end views, on the left and right respectively.

FIG. 4e has the outer pocket layer shown folded over showing the folded shape with the top folded over as depicted from both the side and end views, on the left and right respectively.

FIG. 4f shows the step of inserting the inner pocket layer into the outer pocket layer.

FIG. 4g shows the assembly.

FIG. 4h shows the openings for receiving the inflator and discharge outlets.

FIG. 4i shows the sewn seams adjacent the inflator and discharge openings.

DETAILED DESCRIPTION OF THE INVENTION

With reference to the figures, the same or like components of the airbag assembly will have the same reference numbers for various embodiments to aid in understanding the invention.

In the present invention, the diffuser will be shown used with an exemplary curtain airbag. This is not intended to be limiting in the sense the diffuser may be used in any airbag requiring the ability to absorb the high energy and pressures created by a gas discharging inflator. Such other uses can include large airbags used in pedestrian protection devices mounted on or in vehicles, airbags used in public transport vehicles, like buses, trains and airplanes or any inflatable airbag or inflatable device deployed by rapid inflation.

Figure 1:
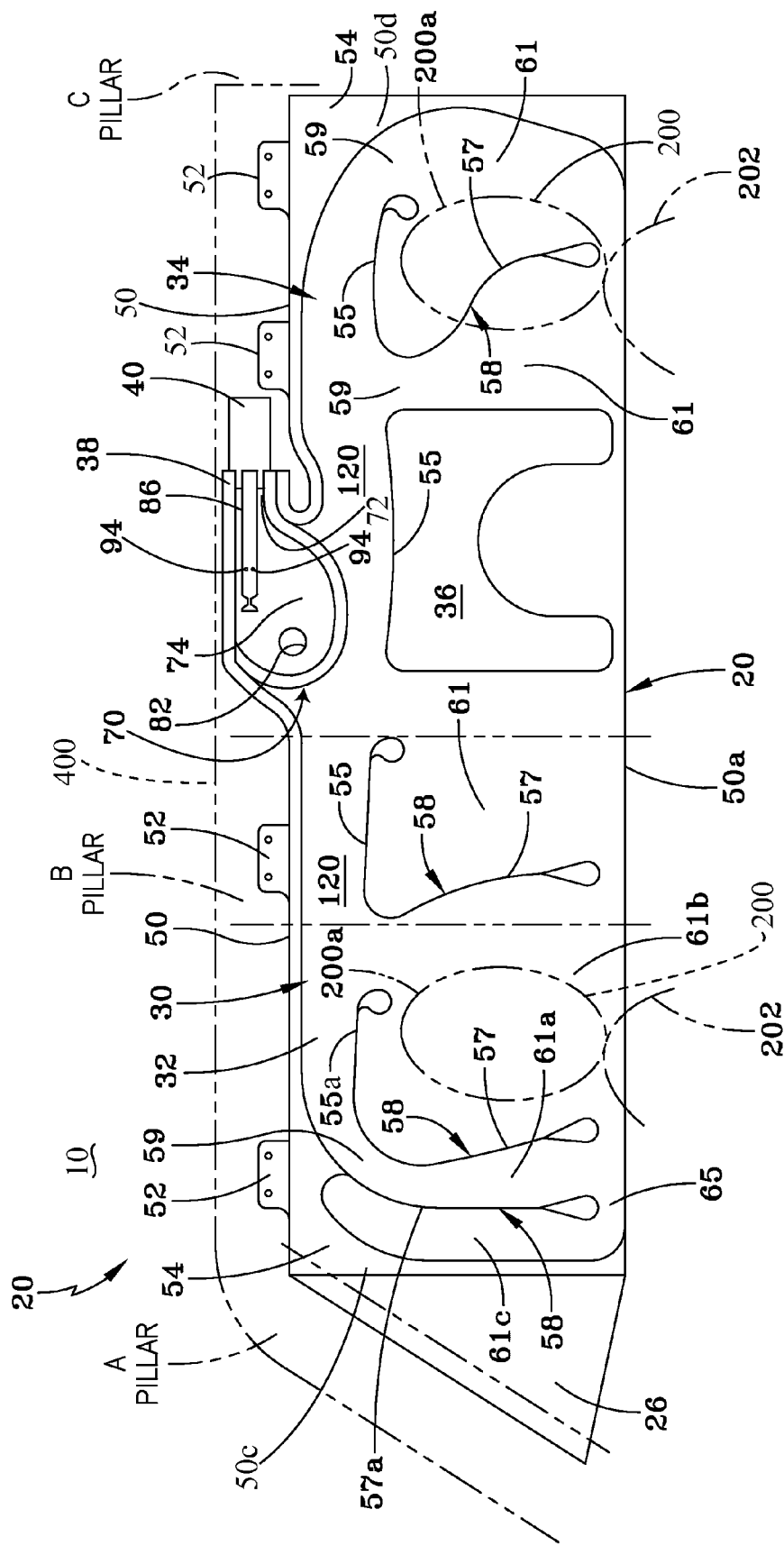
FIG. 1 is a plan view of the first embodiment of the present invention.
Figure 2:
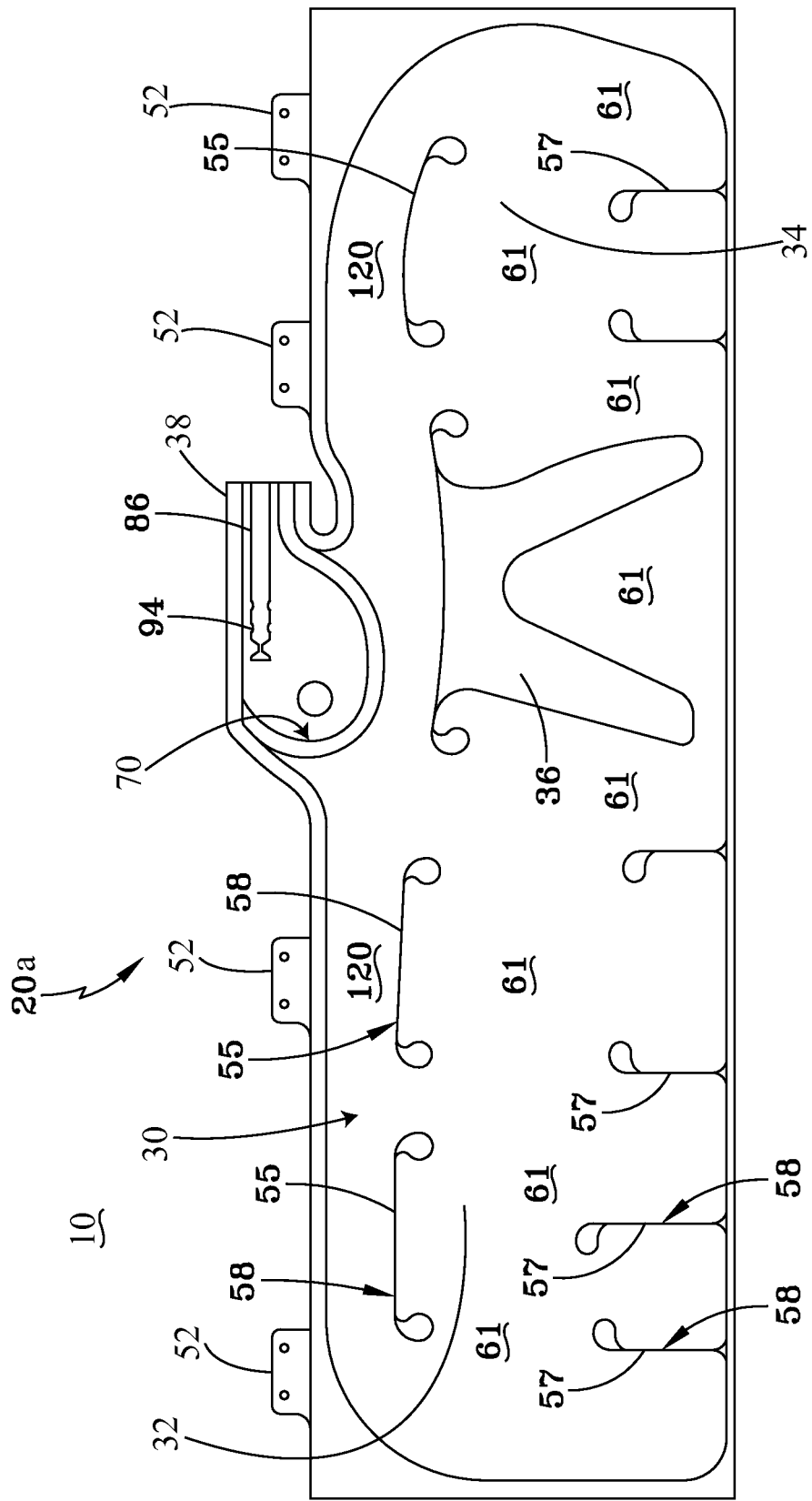
FIG. 2 is a plan view showing a second embodiment of the present invention.

FIGS. 1 and 2 show versions of an exemplary center-fill curtain airbag 20 and 20a. As is known in the art, a curtain airbag is typically arranged to lie along the roof rail of a vehicle, above the vehicle door or doors. The air bag is typically maintained in a folded or rolled condition along the roof rail 400 and covered by a protective housing or trim piece (not shown) at the roof rail. The air bag deploys through this protective housing or trim piece in a manner as a curtain (or blind) to cover the interior side of the passenger compartment to protect the head and shoulder of the occupant, shown in phantom line, see numerals 200 and 202. Each of the airbags 20 and 20a has an inflatable volume 30 separated into one or more inflatable chambers. The inflatable volume 30 in the illustrated embodiments is subdivided into a forward 32 and/or rearward 34 inflatable chamber separated by a large non-inflatable region 36. Each airbag includes an inlet 38 arranged between the forward and rearward inflatable chambers; the inlet 38 is communicated to a source of inflation gas such as an airbag inflator 40.

The top (or top portions) 50 of the inflatable parts of the airbag 20 or 20a is formed with a plurality of tabs 52, permitting the airbag to be mounted to and secured to the roof rail 400. As is known in the art, each airbag such as 20 and 20a is formed utilizing woven material configured to inflate upon receipt of inflation gas. Either airbag can be manufactured utilizing a one-piece-woven technique in which the airbag is made on a Jacquard loom. This known type of weaving technique creates peripheral non-inflatable regions or edge borders such as 54, the non-inflatable region 36, and various joints, seams or tethering links 58, which join the inner and outer panels of the airbag together. The inner and outer panels form two opposing sides. Upon inflation, the outer panel or outer side will lie adjacent the door or vehicle interior facing side 402, and inner panel or inner side will face the interior of the passenger compartment of the vehicle. The seams or joints 58 are employed to reduce the inflatable volume of the airbag as is known in the art. The edge border, non-inflatable regions and joints could be formed if the airbag were constructed using a more conventional sewing technique, as also known in the art.

The various joints or seams 58 are separated from non-inflatable region 36, and edge border 54 subdivides the forward and rearward inflatable chambers 32 and 34 into adjacent inflatable regions 61, 61a, 61b and 61c. The top portions (tops) 55 of each joint or seam 58 are spaced from the top 50 of the airbag and form a distribution channel 120 for inflation gas. In FIG. 1 many of the joints or seams 58 are configured with a flat top 55 and descending leg 57. The spacing between each individual joint or seam 58 and the spacing between each joint or seam and the top and bottom of the airbag is chosen to control the flow of inflation gas to each of the inflatable regions 61. For example, the spacing of a top portion 55a of one of the joints 58 relative to the top of the airbag is made to initially reduce the gas flow to an inflatable region such as 61a that is situated in front of the region 61b, which is adjacent the head of an occupant seated in the front seat of the vehicle. By restricting the gas flow to region 61a (and region 61c), the gas flow to the region 61b is increased, causing the inflatable regions of the airbag adjacent the head of an occupant to be protected to inflate more rapidly and be positioned adjacent the occupant to be protected.

As mentioned above, the top 55 of each seam 58 forms the integral distribution, flow, or gas channel 120. The descending leg portion 57 of each seam separates the forward and rearward inflatable regions of the airbag into the smaller regions 61, 61a, 61b, and 61c, as mentioned above. The top portions 55 of each joint 58 are spaced from one another to provide openings 59 within the channel 120, permitting inflation gases to descend into the adjacent inflatable regions 61-61c. The forward most inflatable region 61c is between a forward edge border or edge border seam 54 and leg 57a. The entrance to region 61c is through a small opening 65 located at the bottom 50a of the airbag. During inflation of the airbag the inflation of this forward region will be delayed relative to the inflation of regions proximate the location of the occupant's head 200a such as, for example, region 61b.

The forward border 54 of the airbag is connected to the A-pillar of the vehicle through a flexible panel 26 of (airbag) material, which need not be inflatable. The inflator 40 is mounted to the roof rail in an appropriate manner and the rear edge border or edge border seam 54 is adapted to be mounted to a rear pillar of the vehicle such as at the C or D pillar of the vehicle.

The inlet 38 is generally elevated relative to the top portions 50 of the inflatable regions of the airbag and is adapted to be connected to an inflator 40. Airbag 20 or 20a includes a diffuser 70. As illustrated in various figures, the diffuser includes a neck 72 and a chamber 74; the inlet neck 72 is also adapted to receive the inflator 40. The diffuser in a flat, uninflated condition, the neck 72 is shown having a diameter sized to accommodate the inflator 40. The inlet neck 72 is in communication with a larger volume or chamber 74. This inlet neck 72 forms the inlet opening 38 for receiving the inflator 40.

In the illustrated embodiment the diffuser 70 is constructed of a double layer of woven fabric (630 denier), which is assembled in a unique way and sewn, typically multiple times, together along one or more seams 78 to provide the shape as illustrated.

Reference is briefly made to FIG. 2. Airbag 20a is of similar construction to airbag 20. The leg portions 57 of seams 58 are not connected to the top sections 55. In this embodiment, the leg portion 57 generally extends radially inward from an outer edge of the inflatable portions of the airbag. The regions of the airbag between the upper portions 55 and leg portions 57 define the various inflatable regions 61 of the airbag.

Figure 3:
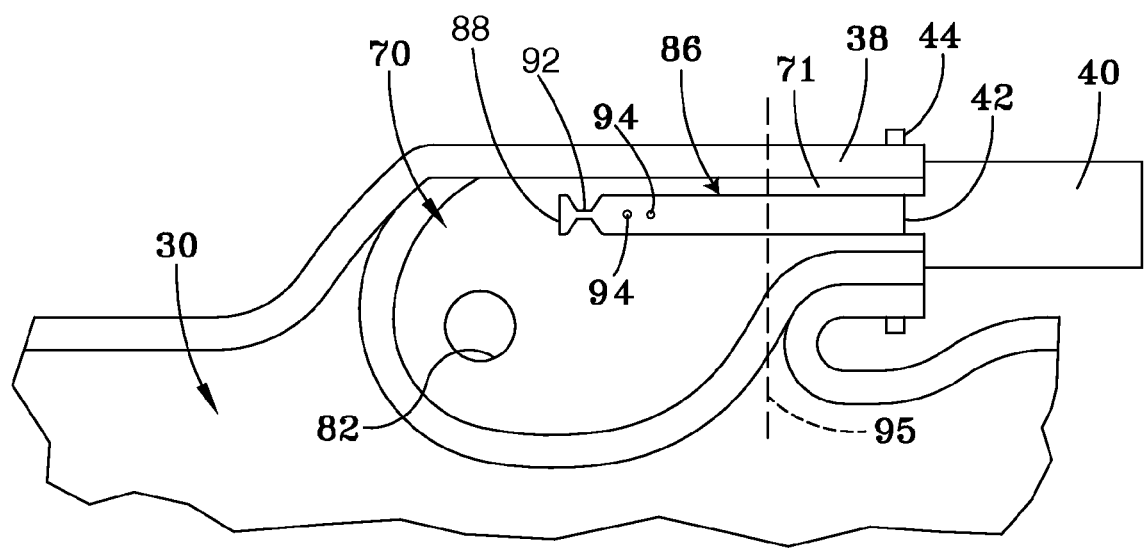
FIG. 3 is a plan view of an exemplary diffuser made according to the present invention.

FIG. 3 is an enlarged view of the inlet 38 of the airbag illustrated in FIGS. 1 and 2. As can be more clearly seen in FIG. 3, the inflator 40 includes a gas discharge nozzle 42, shown diagrammatically, to fill the diffuser chamber 74. Inflator 40 can be an axial flow inflator in which inflation gas exits the inflator in an axial manner or can have a radial flow nozzle with a zero thrust feature to fill the diffuser chamber 74.

A fill tube 86 is illustrated in FIGS. 1, 2, and 3 as well as in FIGS. 5 and 5a. Fill tube 86 is constructed of a hollow, metal tube, preferably non-flexible, having a circular cross-section and an end 88 and an opposite end 90. The tube, proximate end 88, can be crimped generally preventing airflow through open end 88. The crimp is shown by numeral 92. Tube 86, upstream of crimp 92, includes at least one set of exit ports 94; each port is located on an opposite side of the tube. In the illustrated embodiment the tube includes two sets of openings 94. End 90 is hollow and circular in cross-section and adapted to be fitted to an exit port 42 of the inflator 40. As can be appreciated, tube 86 can be connected to the inflator 40 utilizing an intermediate connection member such as crimping or by using a clamp. The inlet 38 of the airbag 20, as well as the neck 72 of the diffuser 70, is secured about the inflator 40 by a clamp 44, as shown in FIG. 4.

In the illustrated embodiment of the invention, each of the openings 94 is oriented relative to the airbag such that inflation gases exit the tube 86 into the diffuser 70 in a side-to-side manner. Additionally, the exit ports 94 of the tube 86 are located generally downstream of the transition between the convex and concave regions of the diffuser; this transition is shown by phantom line 95. The convex portion of the diffuser is characterized by having a relatively smaller diameter than that of the concave portions of the diffuser. By positioning the exit ports 94 at or downstream of the transition region, hoop stress generated within the diffuser is controlled. As is known in the art, hoop stress is directly proportional to pressure and diameter while indirectly proportional to the thickness of the material. As can be appreciated, gas flow through the end 88 is axial in nature; the gas flow exiting the ports has a significant component that is perpendicular (radial) to the axial flow. In this manner, the tube also serves to convert the gas flow from axial to radial or substantially radial in view of the crimp 92. As can also be appreciated, the gas exiting the ports 94 may not be totally radial as a portion of the flow exiting the ports may still contain an axial component, generally due to the forward movement of the inflation gas.

One of the benefits of using the crimped hollow tube, such as illustrated above, is the crimping process does not introduce sharp edges on the tube 86. End 88, after crimping, remains smooth although somewhat deformed or elliptical in cross-section.

The diffuser 70 is assembled in a unique way to achieve superior strength in the most vulnerable region of attachment to the airbag 30.

As illustrated in FIGS. 4a through 4i, the diffuser 70 is formed from two woven fabric layers. An inner pocket layer 71 is shown on the left and an outer pocket layer 73 is shown on the right in FIGS. 4a-4c. It should be appreciated that each inner and outer pocket layer can be made of multiple layers of material.

Shown best in FIG. 4c, the outer pocket layer 73 has a fold line 77. This fold line 77 is oriented in a direction where the weft and the warp threads are oriented by way of example parallel to one and perpendicular to the other. As shown, the outer pocket layer 73 is also preferably cut in a pattern, preferably laser cut to melt and fuse the cut edges to the shape shown.

The inner pocket layer 71 has a solid fold line 75. The fold line 75 is shown inclined relative to the inner pocket layer 71. In this way the inner layer 71 weft and warp threads are inclined on a bias relative to the fold line 75. This bias angle relation to the weave of the fabric is very important to allowing the assembled inner pocket layer and outer pocket layer to achieve superior strength and ability to absorb very high inflation pressures.

In FIG. 4c, on the left shows the step of folding the inner layer 71 over the fold 75 which is inclined relative to the weave. Then in FIG. 4c, a seam 78 is shown adjacent the fold 75 sealing that portion of inner pocket layer 71. With reference to FIG. 4c on the right, the outer pocket layer 73 is shown folded over the fold 77. When so folded, the inner 71 and outer 73 pocket layers assume the same appearance or shape, but the weaves are inclined on a bias relative to each other. To save space and allow an easier fit, the top of the inner pocket layer 71 is folded over and then tack stitched as shown in FIGS. 4d and 4e. In FIG. 4c, a seam 78 is shown extending from the fold 77. As shown by the directional arrow in FIG. 4f, the inner pocket layer 71 is placed in the outer pocket layer 73. Shown in FIG. 4g, this assembly has the cut edges aligned as well as the fold 75 of the inner pocket 71 is under the seam 78 of the outer pocket 73. This ensures that the region of the diffuser 70 attached to the airbag 20 has one unseamed layer or fold 75 or 77 and one stitched seam 78 overlying or underlying the fold at the location of attached and that the weave of one layer is inclined on a bias relative to the other. It is important to note the outer fold 77 was, by way of example, defined perpendicular to one of the weft or warp thread direction. This need not be the case and could be set at any angle, it is only important that the outer pocket layer 73 have the weave inclined on a bias relative to the weave of the inner layer 71 when assembled to achieve this additional strength advantage. This ensures the weft or warp threads of one layer are not directionally aligned or parallel to the weft or warp threads of the other layer, resulting in both the weft and warp threads of one layer being on a bias angle relative to the other layers' threads, typically 20-70 degrees or 50 to 60 degrees, preferably about 45 degrees. This feature, when combined with the seamless fold of one layer and the over or underlying seam of the other, greatly strengthens the diffuser 70 at the location of attachment to the airbag 20. The diffuser 70 is able to absorb the high pressure without tearing at a seamed border as is common in some single layered diffusers or in those wherein the edges are sewn to the airbag. Once assembled, the bottom edges of the inner and outer pockets 71, 73 are sewn together forming a seam 78 stitched together as shown in FIG. 4h.

With reference to FIG. 4i, the final assembled diffuser 70 is shown wherein below the inlet opening or neck 72 of the inner 71 and outer 73 pocket layers are sewn in a path parallel to the inlet neck 72 at the opening and turning to form a truncated U shaped seam 78. As shown in FIG. 4i, the locations shown as 82a and 82b are the gas discharge outlets 82. The inner 71 and outer 73 pocket layers between these discharge outlets 82 are shown joined together. A small fabric reinforcement (not shown) can be sewn or affixed to the layers reinforcing this area if desired or alternatively these layers can be sewn together forming a seamed border or seam 78 as shown. The gas discharge outlets can alternatively be one or more circular openings 82 as shown in FIGS. 1 and 2.

As used herein the seamed borders of the diffuser 70 are preferably sewn using four or more rows of stitching for strength. Upon assembly to the airbag 20, the diffuser 70 when stitched to the cushion panels has that location between the cushion panel layers resulting in a six layer attachment which has one or more continuous lengths of unseamed fabric. A portion of the continuous lengths of unseamed fabric is from the inner pocket layer 71 and a portion from the outer pocket layer 73. It is understood that these two seamless folds 75 and 77 are not individually continuous, but it is meant to convey the idea that at the attachment location to the airbag along its length has an unseamed fabric supporting the structure. As previously described the diffuser 70 can be used in any airbag. The diffuser 70 for the airbag 20 has an inner 71 and outer pocket layer 73. The inner pocket layer 71 has a fold 75 along an edge. The edge has a stitched seam 78 adjacent the fold. The outer pocket layer 73 has a fold 77 along an edge. The edge has a stitched seam 78 adjacent the fold and wherein the inner pocket layer 73 is positioned inside the outer pocket layer 73 to form the diffuser 70. The respective folds 75, 77 are located under or over the respective stitched seam 78 of the other pocket layer to create a continuous length of seamless layer across the diffuser 70 at a location where the diffuser 70 will be attached to the airbag 20. The fold of the inner pocket 71 is oriented in a first direction relative to the weave of the fabric and the fold of the outer pocket is oriented in a second direction relative to the weave of the fabric wherein the second direction is different from the first direction. Each fold aligns with a stitched seam of the other panel to form one seamless layer and one stitched seam at a location where the diffuser 70 is to be sewn to the airbag 20. The diffuser 70 has the inner 71 and outer 73 pocket layers sewn together in one or more locations spaced below the folds and has unsewn panel portions forming the inlet 72 and the one or more discharge openings 82a, 82b. Below or adjacent the folds, the diffuser 70 has an inlet for receiving the inflator 40 and has the inner pocket layer 71 sewn to the outer pocket 73 in a path at least partially parallel to the attachment to the airbag 20 to form a pocket into which the inflator 40 is inserted. The path extends to a turn and forms a "U" shape sewn seam below the inlet 72 and above one of the discharge openings 82a, 82b.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved airbag assembly (20) comprising:
an inflator (40) for providing a source of inflation gas;
an airbag, the airbag (20) having a first end, a second end and a first side and a second side extending between said ends defining the airbag (20) configured with one or more inflatable chambers (61);
a diffuser (70) having an inlet for receiving the inflator (40) and one or more discharge openings (82a, 82b) to fill the one or more inflatable chambers (61), the diffuser (70) being affixed internal of the airbag (20), the diffuser (70) being formed from at least two separate layers of fabric, at least one folded inner and at least one folded outer pocket layers (71, 73) of fabric, and sewn or otherwise affixed to the airbag (20); wherein at least one layer (71) of the diffuser (70) has a seamless fold (75) at the attachment to the airbag (20) where the diffuser (70) is sewn to the airbag (20) or otherwise affixed; and
wherein the folded inner pocket layer (71) is configured to fit inside the outer pocket layer (73) forming a two-layer structure and the fold (75) in the inner layer (71) is oriented in a first direction relative to the fabric and a fold (77) of the outer layer (73) is oriented in a second direction relative to the fabric wherein the second direction of the outer layer (73) is different from the first direction of the inner layer (71) wherein the fold (75) of the inner pocket layer (71) and the fold (77) of the outer pocket layer (73) each align with a stitched seam of the other pocket layer, respectively to form one seamless layer and one stitched seam where the diffuser (70) is sewn to the airbag (20) wherein the fold (75 or 77) forming the seamless layer of one pocket layer (71 or 73) underlies or overlies the other pocket layer to form two layers, a layer of seamless fabric and a layer of seamed fabric along an entire length of the diffuser (70) at an attachment to the airbag (20) at a top seam, and the first direction and second direction of folds being inclined relative to the other so upon assembly the inner pocket layer fold (75) is directionally inclined on a bias relative to the outer pocket layer fold (77).

2. The improved airbag assembly (20) of claim 1 wherein the pocket layers (71, 73) of the diffuser (70) have a seamless fold at the attachment of the airbag (20) where sewn to the airbag (20) or otherwise affixed.

3. The improved airbag assembly (20) of claim 1 wherein the diffuser (70) has the two inner and outer pocket layers (71, 73) sewn together in one or more locations spaced from the fold (75) and has unsewn panel portions forming an inlet neck (72) and the one or more discharge openings (82a, 82b).

4. The improved airbag assembly (20) of claim 3 wherein adjacent the fold (75) at the inlet neck (72) for receiving the inflator (40) has the inner pocket layer (71) sewn to the outer pocket layer (73) in a path at least partially parallel to the attachment to the airbag (20) to form a pocket into which the inflator (40) is inserted.

5. The improved airbag assembly (20) of claim 4 wherein the path extends to a turn and forms a "U" shape sewn seam below the inlet neck (72) and above one of the discharge openings (82a, 82b).

6. A diffuser (70) for an airbag (20) comprises:
    an inner pocket layer (71), the inner pocket layer (71) being a piece of fabric having a fold (75) along an edge, the edge has a stitched seam (78) adjacent the fold (75);
    an outer pocket layer (73), the outer pocket layer (73) being a separate piece of fabric having a fold (77) along an edge, the edge has a stitched seam (78) adjacent the fold (77); and
    wherein the inner pocket layer (71) is positioned inside the outer pocket layer (73) to form the diffuser (70), respective folds (75, 77) are located under or over the respective stitched seam (78) of the other pocket layer (71 or 73) to create a continuous length of seamless layer across the diffuser (70) at a location where the diffuser (70) will be attached to the airbag (20), wherein the fold (75) of the inner pocket layer (71) is oriented in a first direction relative to the fabric of inner pocket layer (71) and the fold (77) of the outer pocket layer (73) is oriented in a second direction relative to the fabric of outer pocket layer (73) wherein the second direction is different from the first direction, each fold (75, 77) aligns with a stitched seam (78) of the other pocket layer (71 or 73) to form one seamless layer and one stitched seam at a location where the diffuser (70) is to be sewn to a curtain airbag (20).

7. The diffuser (70) for an airbag (20) of claim 6 wherein the diffuser (70) has the two inner and outer pocket layers (71, 73) sewn together in one or more locations below or spaced from the folds (75, 77) and has unsewn panel portions forming an inlet (72) and one or more discharge openings (82a, 82b).

8. The diffuser (70) for an airbag (20) of claim 6 wherein below or adjacent the folds (75, 77), the diffuser (70) has the inlet (72) for receiving an inflator (40) and has the inner pocket layer (71) sewn to the outer pocket layer (73) in a path at least partially parallel to the attachment to the airbag (20) to form the inlet (72) a into which the inflator (40) is inserted.

9. The diffuser (70) for an airbag (20) of claim 8 wherein the path extends to a turn and forms a "U" shape sewn seam below the inlet (72) and above one of the discharge openings (82a, 82b).

10. A method of manufacturing a two-layer fabric diffuser (70) comprises the steps of:
    cutting an inner pocket fabric layer (71) from a first piece of fabric;
    folding the inner fabric layer (71) to form an edge or fold (75) with a seamless portion and sewing a portion of the inner pocket fabric layer together up to the fold (75) which forms the seamless portion;
    cutting an outer pocket fabric layer (73) from a second separate piece of fabric;
    folding the outer fabric layer (73) to form an edge or fold (77) with a seamless portion and sewing a portion of the outer pocket fabric layer (73) together up to the fold (77) which forms the seamless portion;
    inserting the folded inner pocket layer (71) into the folded outer pocket layer (73) to form an assembly;
    sewing a bottom seam (78) on the assembly forming one or more discharge openings (82a, 82b), discharge opening (82b) between the edge or fold (75) and the bottom seam (78);
    sewing a "U" shaped inlet seam (78) below the edge or fold (77) to form an inlet (72, 90) for receiving an inflator (40), the "U" shaped inlet seam (78) being spaced from the edge or fold (75), discharge opening (82a) being between the "U" shaped inlet seam (78) and the bottom seam (78); and
    wherein the step of folding includes folding the inner layer (71) in a first direction relative to the fabric of the inner layer (71) and folding the outer layer (73) in a second direction relative to the fabric of the outer layer (73) wherein the second direction of the fold (77) is different from the first direction of the fold (75) and the step of inserting has the first direction and second direction of the folds (75, 77) being inclined relative to the other so upon assembly the inner pocket fabric layer (71) fold (75) is directionally inclined on a bias relative to the outer pocket fabric layer (73) fold (77).

* * * * *